(12) United States Patent
Asami

(10) Patent No.: US 7,844,685 B2
(45) Date of Patent: Nov. 30, 2010

(54) APPARATUS AND METHOD FOR PERFORMING CONTENTS DISTRIBUTION PROCESS

(75) Inventor: Akiko Asami, Shizuoka (JP)

(73) Assignee: Sony Corporation, Tokyo (JP)

( * ) Notice: Subject to any disclaimer, the term of this patent is extended or adjusted under 35 U.S.C. 154(b) by 852 days.

(21) Appl. No.: 10/513,534

(22) PCT Filed: May 19, 2003

(86) PCT No.: PCT/JP03/06183

§ 371 (c)(1),
(2), (4) Date: Nov. 4, 2004

(87) PCT Pub. No.: WO03/100679

PCT Pub. Date: Dec. 4, 2003

(65) Prior Publication Data

US 2005/0197908 A1    Sep. 8, 2005

(30) Foreign Application Priority Data

May 23, 2002    (JP)    ............... P2002-148524

(51) Int. Cl.
*G06F 15/16* (2006.01)
(52) U.S. Cl. .................................. 709/219; 705/26
(58) Field of Classification Search ................ 709/219; 705/26
See application file for complete search history.

(56) References Cited

U.S. PATENT DOCUMENTS

| | | | | |
|---|---|---|---|---|
| 6,065,044 A * | 5/2000 | Ogasawara | ............... | 709/207 |
| 6,718,372 B1 * | 4/2004 | Bober | ............... | 709/217 |
| 6,754,699 B2 * | 6/2004 | Swildens et al. | ............ | 709/217 |
| 6,959,327 B1 * | 10/2005 | Vogl et al. | ............... | 709/219 |
| 7,069,325 B1 * | 6/2006 | Lu et al. | ............... | 709/226 |
| 2002/0078174 A1 * | 6/2002 | Sim et al. | ............... | 709/219 |
| 2002/0107973 A1 * | 8/2002 | Lennon et al. | ............ | 709/231 |
| 2003/0093518 A1 * | 5/2003 | Hiraga | ............... | 709/224 |
| 2003/0115326 A1 * | 6/2003 | Verma et al. | ............... | 709/225 |

FOREIGN PATENT DOCUMENTS

| | | |
|---|---|---|
| JP | 11-068744 | 8/1997 |
| JP | 10-254968 | 9/1998 |
| JP | 11-055258 | 2/1999 |
| JP | 2002-041351 | 7/2000 |
| JP | 2002-074136 | 9/2000 |

(Continued)

*Primary Examiner*—George C Neurauter, Jr.
*Assistant Examiner*—Mark D Fearer
(74) *Attorney, Agent, or Firm*—K&L Gates LLP

(57) ABSTRACT

An information processing apparatus and method, information management apparatus and method, recording medium, and program that permit efficient use of hardware resources and distribute contents with ease are provided. When communication can be established via a network (when the line is available), clients 11-1 through 11-3, which have acquired contents from a contents distribution server and stored them, transmit the stored contents to remote clients in accordance with destination designation information attached to the contents. For example, client 11-1 transmits the contents, which have been acquired from the contents distribution server and stored, to clients 12-1 and 12-2, which are designated as destination clients by the destination designation information. The present invention can be applied, for example, to a router or a personal computer providing a communication section and a hard disk or other storage medium.

5 Claims, 17 Drawing Sheets

| | FOREIGN PATENT DOCUMENTS | | JP | 2002-041351 | 2/2002 |
|---|---|---|---|---|---|
| JP | 2002-084521 | 9/2000 | WO | 02/29551 A2 | 4/2002 |
| JP | 2002-111720 | 9/2000 | | | |
| JP | 2002-133310 | 10/2000 | * cited by examiner | | |

FIG. 9

| CONTENTS 1 |
|---|
| CONTENTS 2 |
| CONTENTS 3 |
| CONTENTS 4 |
| CONTENTS 5 |
| CONTENTS 6 |
| CONTENTS 7 |
| CONTENTS 8 |
| CONTENTS 9 |
| CONTENTS 10 |

| CLIENT | DESTINATION ADDRESS 1 | DESTINATION ADDRESS 2 | DESTINATION ADDRESS 3 |
|---|---|---|---|
| 111-1 | 112-1 | 112-2 | 112-3 |
| 112-1 | 113-1 | 113-2 | — |
| 112-2 | 113-3 | 113-4 | — |

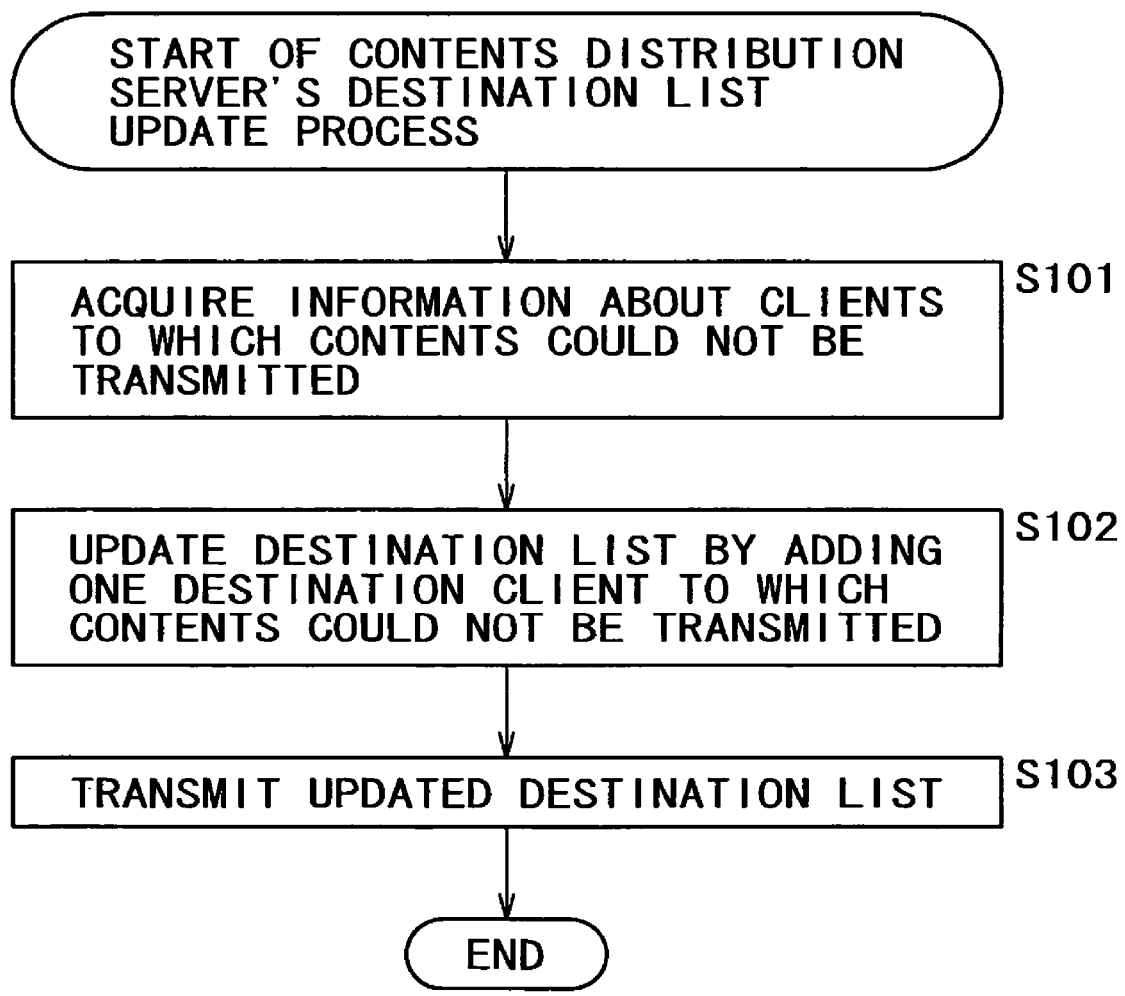

APPARATUS AND METHOD FOR PERFORMING CONTENTS DISTRIBUTION PROCESS

CROSS REFERENCES TO RELATED APPLICATIONS

The present application claims priority to Japanese Patent Document No. P2002-148524 filed on May 23, 2002, the disclosure of which is herein incorporated by reference.

BACKGROUND OF THE INVENTION

The present invention relates to an information processing apparatus and a method, an information management apparatus and a method, a recording medium, and a program. More particularly the present invention relates to an information processing apparatus and a method, an information management apparatus and a method, a recording medium, and a program that permit efficient use of hardware resources and distribute contents with ease.

In recent years, various broadband environments are being established. Therefore, the supply of service contents such as English school lessons and banking operations and the distribution of video data, music data, and other contents have been initiated vigorously.

A server providing a contents distribution service reads contents in compliance with requests from individual clients, and supplies the read contents to the clients. The clients can thus store the contents or perform, for example, a streaming reproduction.

However, in a central server type (concentrated) distribution service in which a plurality of clients access a single server to perform, for example, a contents streaming reproduction, it is difficult for the server to achieve distribution in compliance with all requests while maintaining contents quality if a contents distribution is simultaneously requested by a large number of clients.

More specifically, if a contents distribution is requested simultaneously by many clients, it is difficult to acquire transmission paths (transmission bands) between the server and clients. In addition, the processing load imposed on the server increases. As a result, the server cannot readily accomplish distribution in compliance with all requests.

The use of a high-performance server or a decentralized distribution server including a plurality of computers is proposed in order to handle simultaneous access from many clients. However, if such a large-scale distribution server is constructed, its management cost is very high and it is difficult to earn such a high cost. In general, a large number of clients gain access during a specific period of time such as at night on weekends. However, if the server is constructed so as to handle the access (maximum load) during such a period of time, the server is not fully used during daytime on weekdays or other period of time during which access is infrequently gained. It means that the resulting efficiency is low because the hardware resources are wasted.

SUMMARY OF THE INVENTION

The present invention relates to an information processing apparatus and a method, an information management apparatus and a method, a recording medium, and a program. More particularly the present invention relates to an information processing apparatus and a method, an information management apparatus and a method, a recording medium, and a program that permit efficient use of hardware resources and distribute contents with ease.

The present invention in an embodiment facilitates contents distribution while assuring the efficient use of hardware resources.

An information processing apparatus according to an embodiment of the present invention includes storage means for storing contents that are supplied from an information management apparatus, transmission means for transmitting contents to a first remote information processing apparatus that is specified by designation information accompanying the stored contents, distribution cost calculation means for calculating the distribution cost of the transmitted contents, and management means for managing price information that corresponds to the calculated distribution cost.

The information processing apparatus according to an embodiment of the present invention may further include acquisition means for acquiring contents from the information management apparatus or from a second remote information processing apparatus that receives the supply of contents from the information management apparatus. In this instance, the storage means stores contents that are acquired by the acquisition means.

The information processing apparatus according to an embodiment of the present invention may further include reproduction means, which, when an instruction is issued to reproduce contents stored by the storage means, reproduces the contents in accordance with price information managed by the management means.

The above-mentioned distribution cost calculation means can calculate the time during which contents are transmitted by the transmission means, and regard the calculated time as a distribution cost. In this instance, the management means manages price information that corresponds to the time calculated by the calculation means.

The distribution cost calculation means can calculate the data amount of contents transmitted by the transmission means and regard the calculated data amount as the distribution cost.

The information processing apparatus according to an embodiment of the present invention may further include detection means for detecting the communication status of the information processing apparatus and communication control means for controlling the contents transmission from the transmission means in accordance with the communication status detected by the detection means.

An information processing method according to an embodiment of the present invention includes a storage step of storing contents supplied from the information management apparatus, a transmission step of transmitting contents to a remote information processing apparatus that is specified by designation information accompanying the contents, a distribution cost calculation step of calculating the distribution cost of the transmitted contents, and a management step of managing price information that corresponds to the distribution cost.

A program recorded on a first recording medium according to an embodiment of the present invention and a first program according to the present invention include a storage control step of controlling the storage of contents supplied from the information management apparatus, a transmission control step of controlling the transmission of contents to a remote information processing apparatus that is specified by designation information accompanying the contents, a distribution cost calculation control step of controlling the calculation of the distribution cost of the transmitted contents, and a management control step of controlling the management of price information corresponding to the calculated distribution cost.

The information processing apparatus, method, and program according to an embodiment of the present invention store contents supplied from the information management apparatus, and transmit the contents to a remote information processing apparatus that is specified by designation information accompanying the stored contents. Further, the distribution cost of the transmitted contents is calculated to manage price information that corresponds to the calculated distribution cost.

The information management apparatus according to an embodiment of the present invention includes storage means for storing contents that are available with the information acquired by the information processing apparatus used as a price when the contents are transmitted from the information processing apparatus to a remote information processing apparatus, generation means for generating, for the information processing apparatus that has acquired contents, designation information that specifies a remote information processing apparatus to which the contents are to be transmitted, and supply means for supplying the contents and designation information to the information processing apparatus.

The information management apparatus according to an embodiment of the present invention may further include management means for managing the location of the information processing apparatus within a network. When the information processing apparatus notifies that the contents cannot be transmitted to the remote information processing apparatus, the generation means can generate designation information that includes information indicating the location of the remote information processing apparatus, which is managed by the management means.

The generation means can generate the designation information so that the information processing apparatus transmits the contents to the remote information processing apparatus when the period during which the information processing apparatus can communicate is longer than the period during which the remote information processing apparatus can communicate.

An information management method exercised by the information management apparatus according to an embodiment of the present invention includes a storage step of storing contents that are available with the information acquired by the information processing apparatus used as a price when the contents are transmitted from the information processing apparatus to a remote information processing apparatus, a generation step of generating, for the information processing apparatus that has acquired contents, designation information that specifies a remote information processing apparatus to which the contents are to be transmitted, and a supply step of supplying the contents and designation information to the information processing apparatus.

A program recorded on a second recording medium according to an embodiment of the present invention and a second program according to the present invention include a storage control step of controlling the storage of contents that are available with the information acquired by the information processing apparatus used as a price when the contents are transmitted from the information processing apparatus to a remote information processing apparatus, a generation step of generating, for the information processing apparatus that has acquired contents, designation information that specifies a remote information processing apparatus to which the contents are to be transmitted, and a supply control step of controlling the supply of the contents and designation information to the information processing apparatus.

The information management apparatus, method, and program according to an embodiment of the present invention store contents that are available with the information acquired by the information processing apparatus used as a price when the contents are transmitted from the information processing apparatus to a remote information processing apparatus, and generate, for the information processing apparatus that has acquired contents, designation information that specifies a remote information processing apparatus to which the contents are to be transmitted. Further, the contents and designation information are supplied to the information processing apparatus.

The foregoing term "communication" may represent wireless communication, wired communication, or a mixture of both in which wireless communication is used in one block whereas wired communication is used in another block. Another alternative is to use wired communication for the transmission from a first apparatus to a second apparatus and wireless communication for the transmission from the second apparatus to the first apparatus.

The foregoing term "contents" represents various digital data, including video image, music data, and an application program that is used in the information processing apparatus.

Additional features and advantages of the present invention are described in, and will be apparent from, the following Detailed Description of the Invention and the figures.

BRIEF DESCRIPTION OF THE FIGURES

FIG. 9 shows an example of contents that are stored in a contents storage section shown in FIG. 5.

FIG. 14 shows an example of a destination list.

FIG. 17 is a flowchart illustrating a process that is performed by a contents distribution server.

DETAILED DESCRIPTION OF THE INVENTION

The present invention relates to an information processing apparatus and a method, an information management apparatus and a method, a recording medium, and a program. More particularly the present invention relates to an information processing apparatus and a method, an information management apparatus and a method, a recording medium, and a program that permit efficient use of hardware resources and distribute contents with ease.

Figure 1:
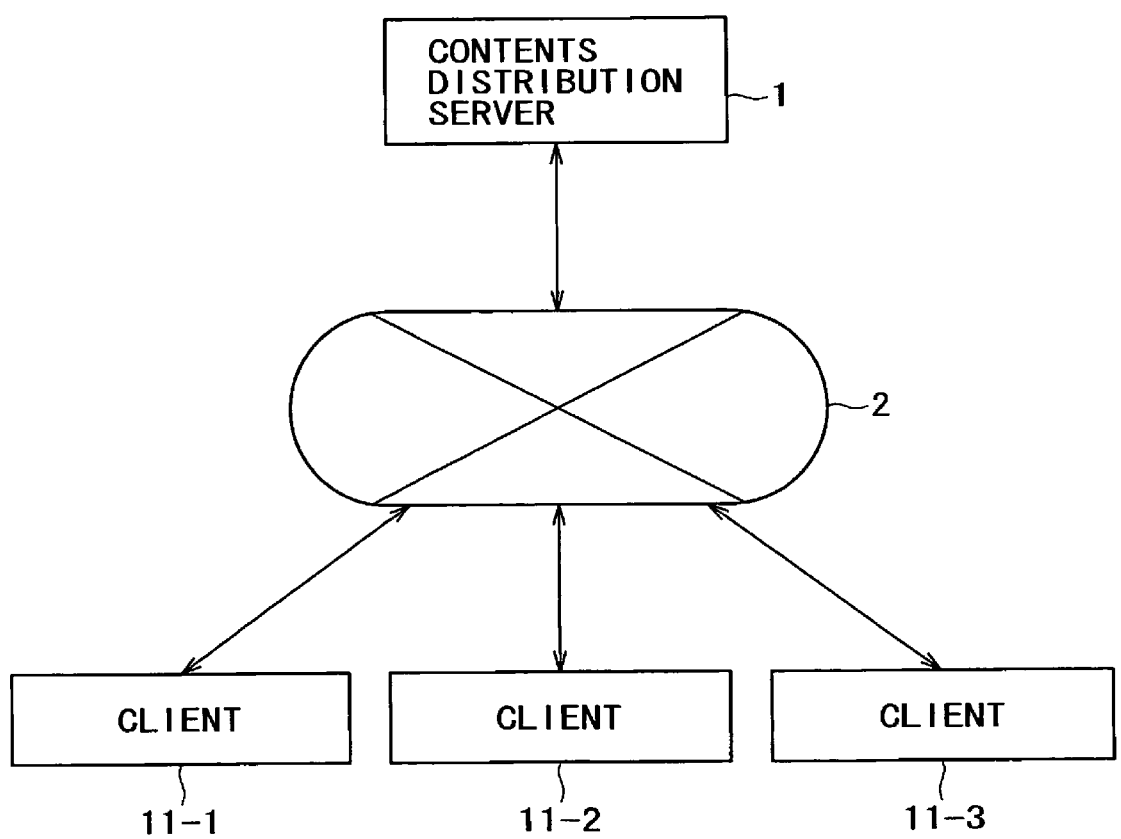
FIG. 1 is a block diagram illustrating a typical configuration of a contents distribution system according to an embodiment of the present invention.

FIG. 1 is a block diagram illustrating a typical configuration of a contents distribution system according to an embodiment of the present invention.

A contents distribution server 1 manages a plurality of contents supplied from a contents holder, which is not shown, and supplies video data, music data, or other similar contents via a network 2 in compliance with requests from clients 11-1 through 11-3, which are connected to the network 2. The example shown in FIG. 1 illustrates clients 11-1 through 11-3 as the clients that receive the contents supplied from the contents distribution server. In reality, however, many other clients are connected to the network 2.

Clients 11-1 through 11-3 store contents when they acquire the contents from the contents distribution server 1. Clients 11-1 through 11-3 are hereinafter generically referred to as client 11 if they need not be differentiated from each other. This also holds true for the other clients that will be described later. In compliance with designation information written in a header for stored contents, client 11 transmits stored contents to the other clients connected to the network 2 at a predetermined timing when, for example, communication can be established while no process is being performed via the network 2.

Upon receipt of the contents supplied from client 11, the other clients transmit the contents supplied from client 11 to the still other clients in compliance with designation information written in the header while communication can be established as is the case with client 11.

In the process described above, the supplied contents are transmitted from one client to a plurality of clients. The process is repeatedly performed by all clients. As a result, the contents supplied from the contents distribution server 1 are supplied to a large number of clients.

Figure 2:
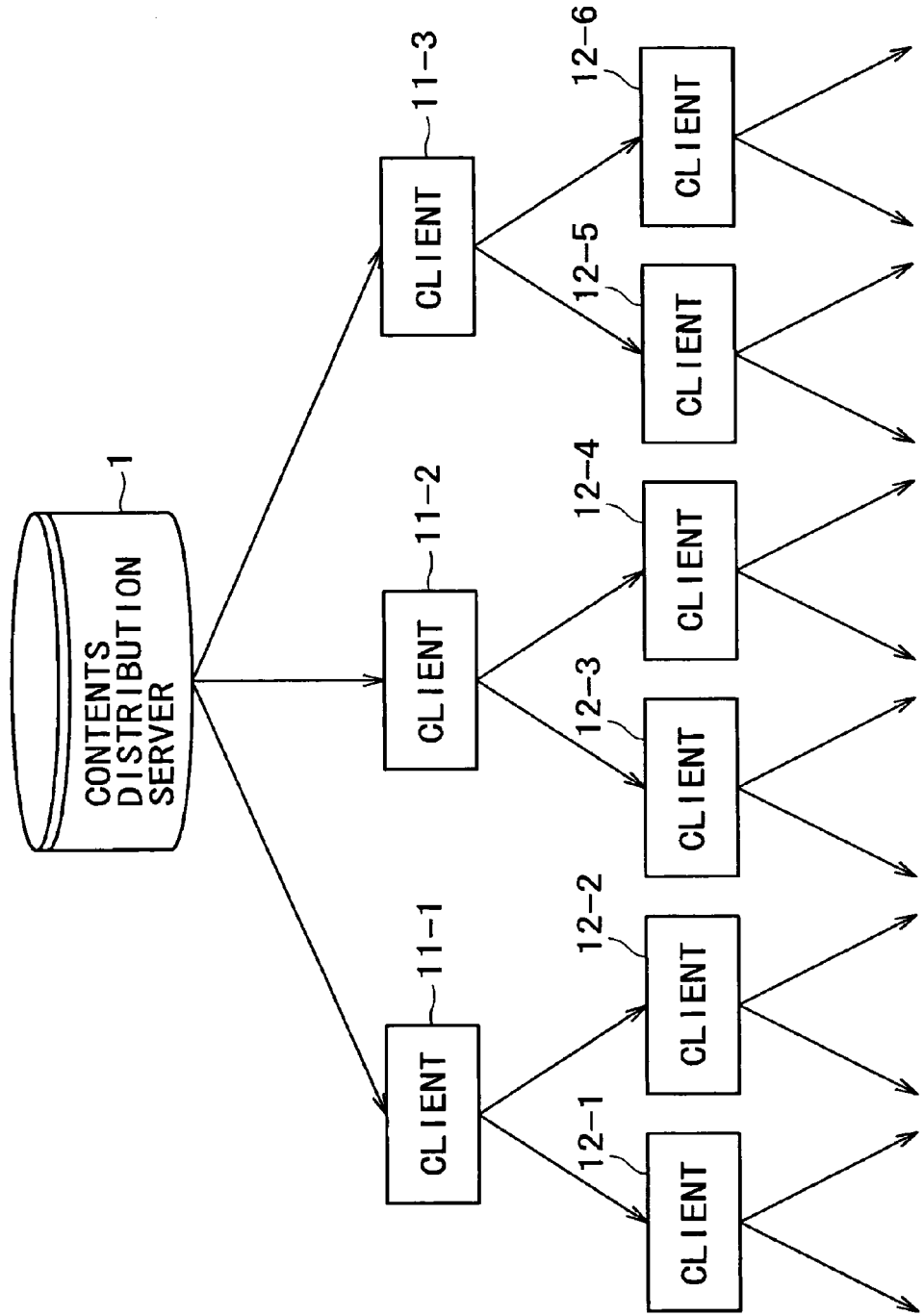
FIG. 2 is a schematic diagram illustrating how contents are distributed from a contents distribution server that is shown in FIG. 1.

FIG. 2 is a schematic diagram illustrating a process in which contents supplied from the contents distribution server 1 are distributed to many clients.

As shown in FIG. 2, the contents supplied from the contents distribution server 1 to client 11-1 are transmitted from client 11-1 to clients 12-1 and 12-2 via the network 2 in compliance with destination designation information written in the header for the contents, and stored by clients 12-1 and 12-2. When the clients are ready for communication, the contents stored by clients 12-1 and 12-2 are further transmitted to lower-level clients (not shown) in compliance with the destination designation information written in the header.

Similarly, the contents supplied from the contents distribution server 1 to client 11-2 and stored are transmitted to clients 12-3 and 12-4, which are designated by the destination designation information, when client 11-2 is ready for communication, and stored by clients 12-3 and 12-4. When clients 12-3 and 12-4 are ready for communication, the contents are further transmitted to lower-level clients in compliance with the destination designation information. In addition, the contents supplied from the contents distribution server 1 to client 11-3 are similarly transmitted to clients 12-5 and 12-6 when client 11-3 is ready for communication.

As described above, the contents supplied from the contents distribution server 1 are sequentially transmitted to other clients at an appropriate communication timing when the user is not performing a process via the network 2. Therefore, communications links and other hardware resources can be efficiently used. For clients who are always connected to the network 2, it is preferred that the period of time during which they are not communicating with the other devices be short. The hardware resources can be efficiently used by transmitting contents while the clients are not communicating with the other devices.

Further, the contents are sequentially transmitted from clients to clients. Therefore, the frequency of clients' direct access to the contents distribution server 1 can be decreased to reduce the processing load on the contents distribution server 1.

When contents are transmitted to a remote client, the data amount of the transmitted contents, the transmission time (used hours for the line), or the like is calculated as the distribution cost in a contents transmitting client. In accordance with the calculated distribution cost, the contents transmitting client acquires (self-manages) points (price information) for receiving various services such as the one for contents use.

In the contents distribution system shown in FIGS. 1 and 2, a predefined number of points are required whenever stored contents are reproduced. When the user issues an instruction for contents reproduction, accumulated points are used for contents reproduction.

FIG. 2 indicates that each of clients 11-1 through 11-3 transmits contents to two clients. In reality, however, the contents are transmitted to a larger number of clients depending on the time available for communication.

The above client process will be described in detail later with reference to flowcharts.

Figure 3:
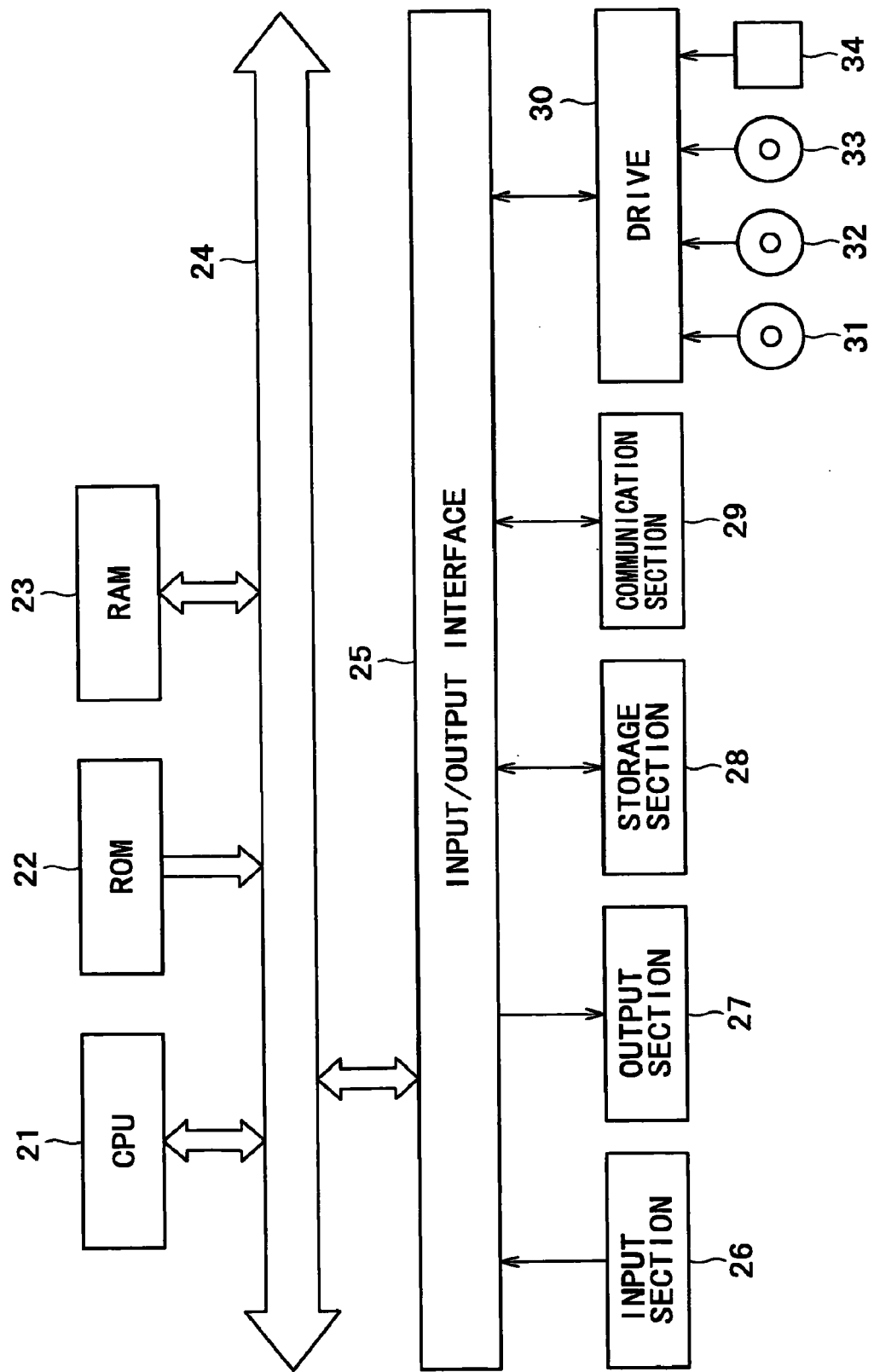
FIG. 3 is a block diagram illustrating a typical configuration of the contents distribution server that is shown in FIG. 1.

FIG. 3 is a block diagram illustrating a typical configuration of the contents distribution server 1.

A CPU (Central Processing Unit) 21 performs various processes in accordance with a program stored in a ROM (Read Only Memory) 22 or a program that is loaded from a storage section 28 into a RAM (Random Access Memory) 23. The RAM 23 also stores as needed the data necessary for various processes that the CPU 21 performs.

The CPU 21, ROM 22, and RAM 23 are interconnected via a bus 24. An input/output interface 25 is also connected to the bus 24.

The input/output interface 25 is connected to an input section 26, which includes, for example, a keyboard and a mouse; a display, which includes a CRT (Cathode Ray Tube) or an LCD (Liquid Crystal Display); an output section 27, which includes, for example, a loudspeaker; a storage section 28, which includes, for example, a hard disk; and a communication section 29, which includes, for example, a modem and a terminal adapter. The communication section 29 performs a communication process via the network 2.

Further, the input/output interface 25 is connected as needed to a drive 30 into which a magnetic disk 31, optical disk 32, magneto-optical disk 33, semiconductor memory 34, or the like is inserted as appropriate. A computer program read from such media is installed as needed into the storage section 28.

Although not shown, client 11 includes a computer that has the same basic configuration as the contents distribution server shown in FIG. 3. In the subsequent explanation, therefore, the configuration shown in FIG. 3 will also be cited as the configuration of client 11.

Figure 4:
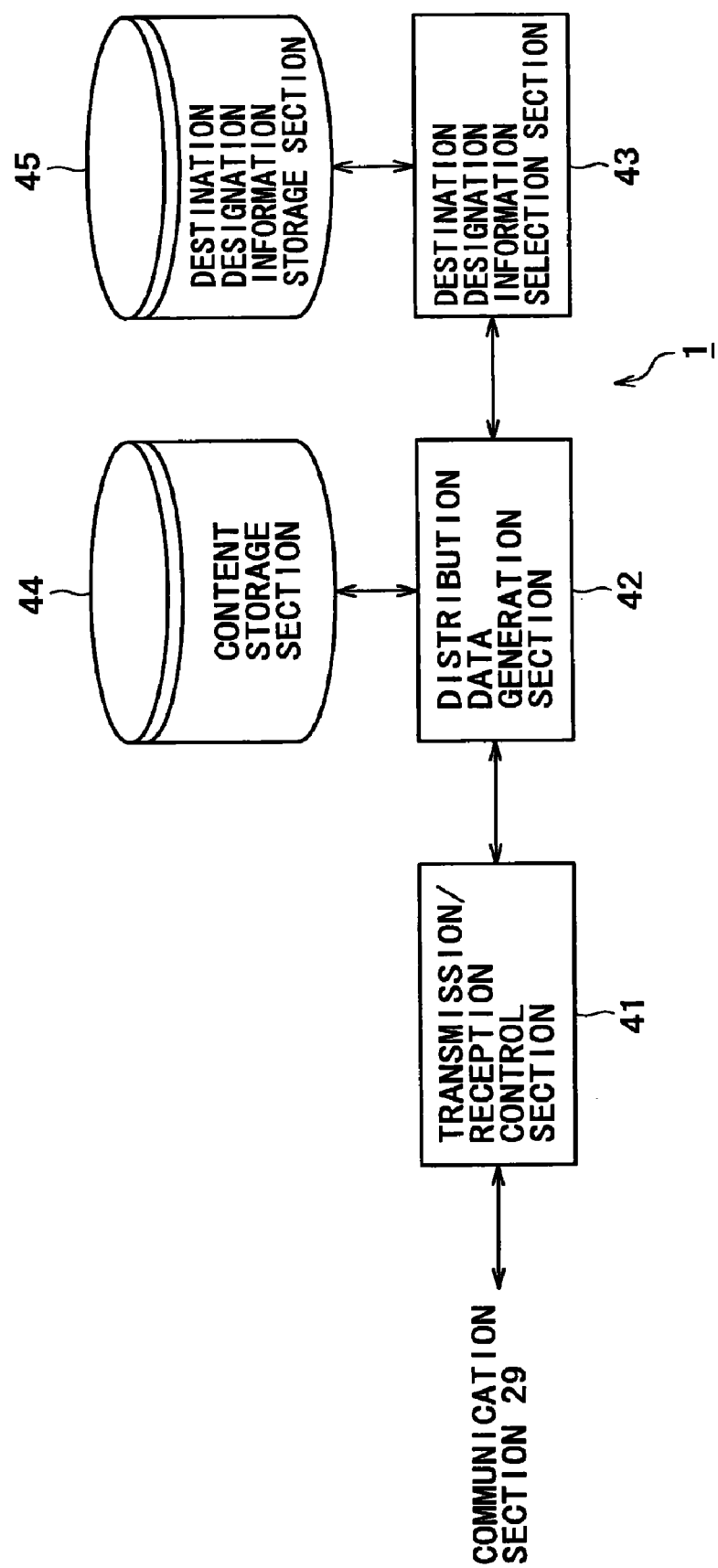
FIG. 4 is a block diagram illustrating a typical functional configuration of the contents distribution server that is shown in FIG. 1.

FIG. 4 is a block diagram illustrating a typical functional configuration of the contents distribution server 1. The elements shown in FIG. 4 are implemented when a predetermined program stored in the ROM 22 or storage section 28 is loaded into the RAM 23 and executed by the CPU 21 of the contents distribution server 1.

A transmission/reception control section 41 controls the communication between the communication section 29 and various devices. If, for example, a contents transmission request is received from client 11, the transmission/reception control section 41 outputs designation information, which is contained in the transmission request to specify the contents, to a distribution data generation section 42. Further, when distribution data containing contents requested by client 11 is generated by the distribution data generation section 42 and supplied, the transmission/reception control section 41 controls the communication section 29 to transmit the distribution data to client 11 via the network 2.

If designation information, which includes, for example, a contents ID, is supplied from the transmission/reception control section 41, the distribution data generation section 42 reads requested contents from a contents storage section 44 in compliance with the designation information. The contents transmission request from client 11 also contains identification information that identifies client 11. The distribution data generation section 42 outputs the identification information to the destination designation information selection section 43.

The destination designation information selection section 43 selects the destination designation information to be added to the contents, and outputs the selected information to the distribution data generation section 42. The distribution data generation section 42 generates the distribution data to be transmitted to client 11 by adding the destination designation information, which is selected by the destination designation information selection section 43, to the contents read from the contents storage section 44. As described earlier, each client references the contents destination in accordance with the destination designation information added to the contents, and transmits the contents to another client. The distribution data generated by the distribution data generation section 42 is output to the transmission/reception control section 41.

In accordance with the client identification information supplied from the distribution data generation section 42, the destination designation information selection section 43 arbitrarily selects a specified number of destination designation information sets from the destination designation information stored in a destination designation information storage section 45, and outputs the selected destination designation information sets to the distribution data generation section 42. The destination designation information is, for example, address information set for each client in accordance with IPv6 (Internet Protocol Version 6) or identification information (ID) set for each client.

The contents storage section 44 stores contents that are supplied from the contents holder. The destination designation information storage section 45 stores destination designation information such as the address information about each client. The contents storage section 44 and destination designation information storage section 45 compose the storage section 28.

Figure 5:
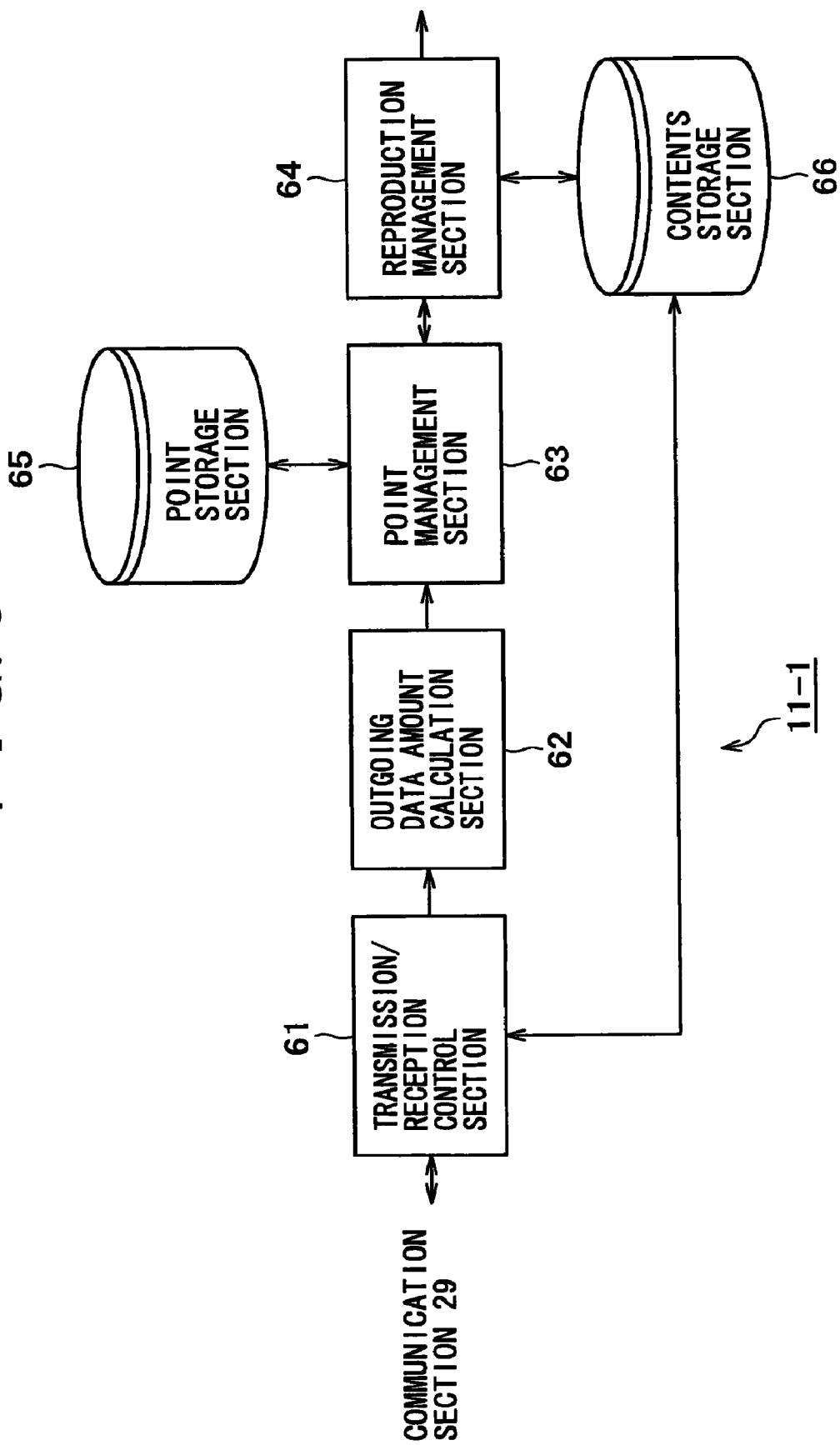
FIG. 5 is a block diagram illustrating a typical functional configuration of a client that is shown in FIG. 1.

FIG. 5 is a block diagram illustrating a typical functional configuration of client 11-1. The elements shown in FIG. 5 are implemented when a predetermined program stored in the ROM 22 or storage section 28 is loaded into the RAM 23 and executed by the CPU 21 of client 11-1. The configuration shown in FIG. 5 is also achieved by the other clients connected to the network 2.

A transmission/reception control section 61 controls the communication that is maintained with the contents distribution server 1 and other clients via the communication section 29. When, for example, the user operates the input section 26 to enter contents designation information, the transmission/reception control section 61 transmits a contents transmission request, which includes the designation information, to the contents distribution server 1 via the network 2. Further, when distribution data containing contents is transmitted from the contents distribution server 1, the transmission/reception control section 61 controls the communication section 29 to acquire the distribution data and stores it in a contents storage section 66.

If, for example, the user is absent and the communication section 29 can establish communication, the transmission/reception control section 61 reads distribution data stored in the contents storage section 66, and transmits the distribution data to another client in compliance with the destination designation information written within the distribution data. If, for example, distribution data supplied from the contents distribution server 1 and acquired by client 11-1 includes the address information about client 12-1 as the destination designation information, the transmission/reception control section 61 of client 11-1 transmits the distribution data to client 12-1 in compliance with the destination designation information.

While the transmission/reception control section 61 transmits distribution data to another client, an outgoing data amount calculation section 62 calculates the data amount of the distribution data, and outputs the resulting information, which indicates the calculated data amount, to a point management section 63.

The point management section 63 calculates the number of points required for the use of various services such as the one for contents reproduction in accordance with the information supplied from the outgoing data amount calculation section 62, and stores the calculated value in a point storage section 65. Further, when a reproduction management section 64 informs that contents stored in the contents storage section 66 are to be reproduced, the point management section 63 determines whether or not the points stored in the point storage section 65 are adequate for reproduction of the contents. If the point management section 63 concludes that the points stored in the point storage section 65 are adequate for contents reproduction, the reproduction management section 64 performs a reproduction process. If, on the other hand, it is concluded that the stored points are not adequate for contents reproduction, the user is informed that the contents cannot be reproduced.

The reproduction management section 64 manages the reproduction of contents stored in the contents storage section 66 such as video data and music data in various formats. When a video signal or music signal is reproduced by the reproduction management section 64, it is output to the LCD, loudspeaker, and other components that compose the output section 27.

The operations of the contents distribution server 1 shown in FIG. 1, and the client 11 will now be described with reference to flowcharts.

First of all, the process performed by the contents distribution server to distribute (transmit) contents in compliance with a request from client 11 will be described with reference to the flowchart in FIG. 6.

When the configuration shown in FIG. 4 is achieved by the contents distribution server 1, the transmission/reception control section 41 determines in step S1 whether or not it is accessed by client 11. The transmission/reception control section 41 stands by until it determines that it is accessed. If the transmission/reception control section 41 determines in step S1 that it is accessed by client 11 via the network 2, it proceeds to step S2 and receives a contents transmission request, which is transmitted from client 11. The transmission request contains, for example, the identification information about contents requested by client 11 as well as the identification information about client 11.

The contents transmission request received by the transmission/reception control section 41 is output to the distribution data generation section 42.

When contents designation information is supplied, the distribution data generation section 42 performs step S3 to read contents requested by client 11 from the contents storage section 44 in accordance with the contents identification information. The identification information about client 11, which is included in the contents designation information, is output to the destination designation information selection section 43 from the distribution data generation section 42.

In accordance with the identification information supplied from the distribution data generation section 42, the destination designation information selection section 43 performs step S4 to select a specified number of destination designation information sets, which provide contents destination designation, and outputs them to the distribution data generation section 42.

In step S5, the distribution data generation section 42 generates distribution data by adding a header, which contains the destination designation information selected by the destination designation information selection section 43, to the contents read in step S3 from the contents storage section 44.

The distribution data generated by the distribution data generation section 42 is output to the transmission/reception control section 41, and transmitted via the network 2 to client 11, which has requested the transmission of contents.

Figure 7:
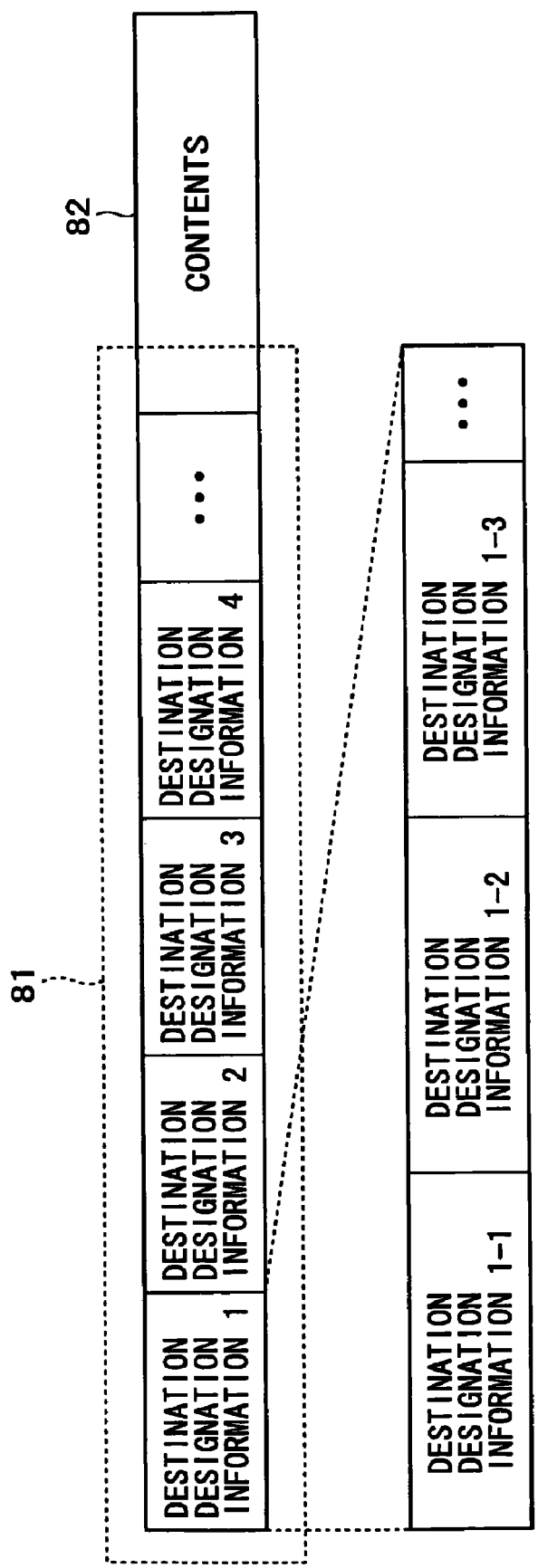
FIG. 7 shows an example of distribution data.

FIG. 7 shows an example of distribution data that is distributed from the contents distribution server 1.

The distribution data basically includes a header 81, which includes destination designation information, and contents 82. In the example shown in FIG. 7, the header 81 includes destination designation information 1, destination designation information 2, destination designation information 3, and destination designation information 4. For example, destination designation information 1 is destination designation information that is to be referenced by clients 11-1 through 11-3, which are nodes directly subordinate to the contents distribution server 1 that functions as a root node as indicated in a tree structure shown in FIG. 2. Destination designation information 2 is destination designation information that is to be referenced by clients 12-1 through 12-6, which are nodes directly subordinate to clients 11-1 through 11-3.

When, for example, the distribution data shown in FIG. 7 is supplied to client 11-1 and is to be transmitted to another client, client 11-1 references destination designation information 1 to acquire a distribution data destination. A plurality of destination designation information sets (destination designation information 1-1, destination designation information 1-2, and destination designation information 1-3) are written within destination designation information 1. For example, client 11-1 references destination designation information 1-1 to transmit the distribution data to client 12-1 and references destination designation information 1-2 to transmit the distribution data to client 12-2. In other words, destination designation information 1-1 represents the address information about client 12-1, whereas destination designation information 1-2 represents the address information about client 12-2.

When the distribution data shown in FIG. 7, which is transmitted from client 11-1, is to be transmitted to another client, client 12-1 references destination designation information (address information) included in destination designation information 2, and transmits the distribution data transmitted from client 11-1 to another client in compliance with the referenced destination designation information. In other words, destination designation information 2 includes the address information about a client to which client 12-1 should transmit the distribution data.

As shown in FIG. 7, the header 81 also includes destination designation information 3 and destination designation information 4. Destination designation information 3 is to be referenced by clients that are nodes directly subordinate to clients 12-1 through 12-6. Destination designation information 4 is to be referenced by clients that are nodes two levels lower than clients 12-1 through 12-6. The header 81 also contains the information indicating the version of destination designation information and the information indicating a contents encryption method.

Figure 8:
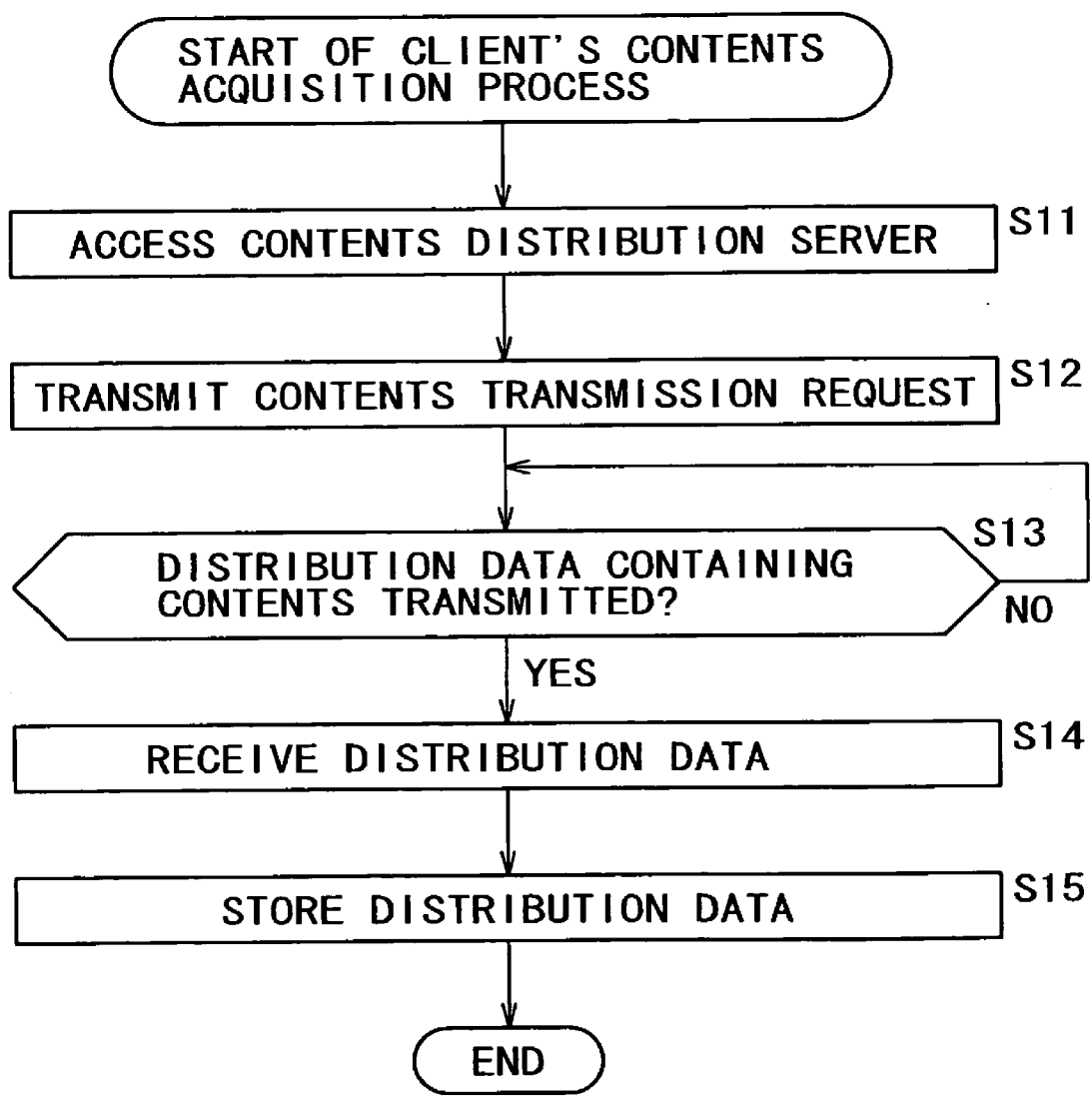
FIG. 8 is a flowchart illustrating a contents acquisition process that is performed by a client shown in FIG. 1.

The contents acquisition process performed by client 11 to acquire distribution data that is distributed from the contents distribution server will now be described with reference to the flowchart in FIG. 8. The process shown in FIG. 8 is performed in relation to the process shown in FIG. 6.

When, for example, the user issues an instruction for accessing the contents distribution server 1 in a situation where the configuration shown in FIG. 5 is achieved by client 11, the transmission/reception control section 61 controls the communication section 29 in step S11 to access the contents distribution server 1 via the network 2.

In step S12, the transmission/reception control section 61 transmits a contents transmission request, which contains, for example, the identification information about user-designated contents and the identification information about client 11, to the contents distribution server 1.

Figure 6:
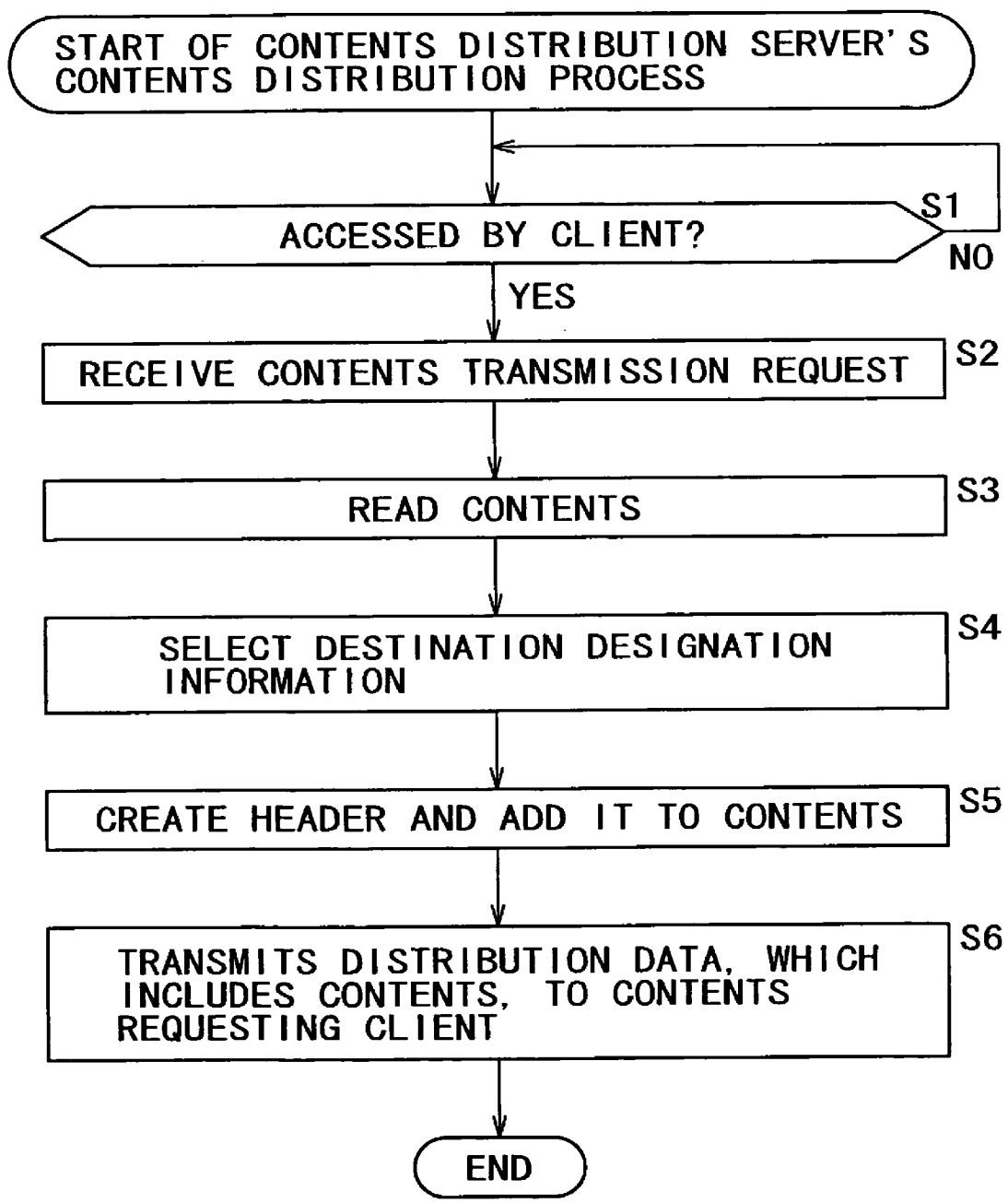
FIG. 6 is a flowchart illustrating a contents distribution process that is performed by the contents distribution server shown in FIG. 1.

Upon receipt of the contents transmission request, the contents distribution server 1 generates and transmits distribution data (process performed in step S6 shown in FIG. 6). Therefore, the transmission/reception control section 61 of client 11 determines in step S13 whether or not the distribution data containing contents is transmitted from the contents distribution server 1. If it is determined in step S13 that the distribution data is transmitted from the contents distribution server 1, the transmission/reception control section 61 receives the transmitted distribution data in step S14, and then proceeds to perform step S15 so that the contents storage section 66 stores the received distribution data.

As a result, the distribution data (contents) are supplied, for example, to client 11-1 from the contents distribution server 1. For example, contents 1 through 10 (distribution data 1 through 10), which are supplied from the contents distribution server 1 or from another client as described later, are stored in the contents storage section 66 of client 11-1. Contents for which no reproduction instruction has been issued by the user for a predetermined period of time such as a three-month period are sequentially deleted. Instead, the contents supplied from the contents distribution server 1 or from another client are newly stored.

The process performed by a client to distribute distribution data (contents) to another client will now be described with reference to the flowchart in FIG. 10. The subsequent explanation mainly deals with an operation in which client 11-1 transmits distribution data to client 12-1.

In step S21, the transmission/reception control section 61 of client 11-1 determines whether or not the line is busy, that is, determines whether or not communication can be established. If it is determined that communication cannot be established, for example, because a predetermined server connected to the network 2 is being accessed, the transmission/reception control section 61 terminates the process.

If it is determined in step S21 that communication can be established, the transmission/reception control section 61 proceeds to step S22 and reads specified contents (distribution data) from the contents storage section 66. In step S22, the user's favorite contents or frequently used contents may be read by referencing a contents use history of the user of client 11-1.

In step S23, the transmission/reception control section 61 reads destination designation information written in the header. If, for example, the distribution data shown in FIG. 7 is read in step S22, the transmission/reception control section 61 reads destination designation information 1, which corresponds to the local node (client 11-1) position. Destination designation information 1 includes destination designation information 1-1, which represents the address information about client 12-1 in FIG. 2, and destination designation information 1-2, which represents the address information about client 12-2. In step S24, the transmission/reception control section 61 transmits distribution data to clients 12-1 and 12-2 in compliance with the destination designation information read in step S23.

In the example shown in FIG. 7, destination designation information 1 also includes destination designation information 1-3 so that the distribution data is also transmitted to a client designated by destination designation information 1-3.

Figure 10:
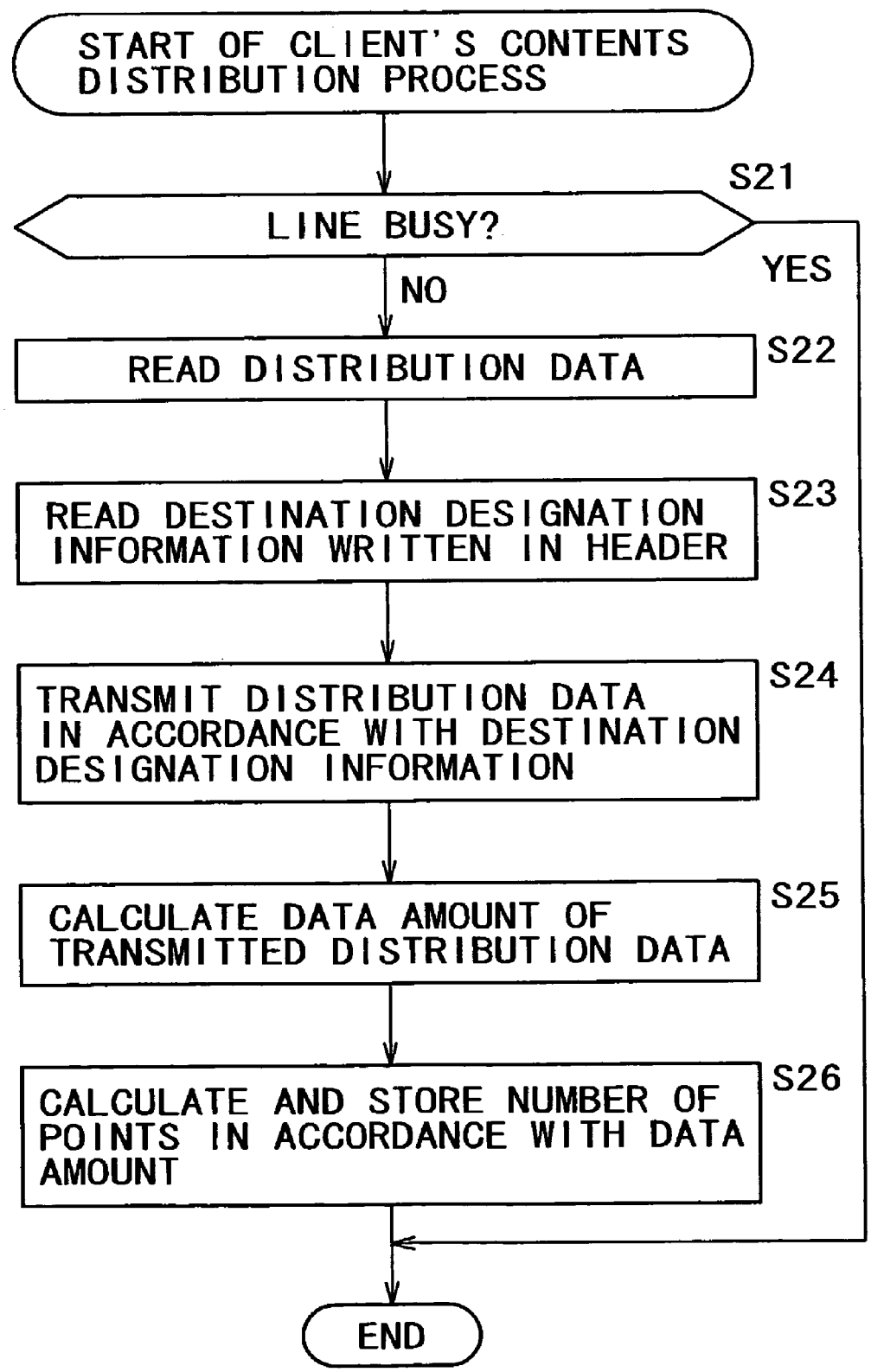
FIG. 10 is a flowchart illustrating a contents distribution process that is performed by a client shown in FIG. 1.

When the process shown in FIG. 10 is performed by second-level clients (clients 12-1 through 12-6) in FIG. 2, such clients reference destination designation information 2 so that the distribution data is transmitted to clients designated by destination designation information 2.

In step S25, the outgoing data amount calculation section 62 calculates the data amount of distribution data (contents) that the transmission/reception control section 61 has transmitted to another client, and outputs the calculation result to the point management section 63. In step S26, the point management section 63 calculates the number of points according to the data amount of the distribution data transmission to the other client, and then adds the calculated number of points to the points stored in the point storage section 65. The points stored in the point storage section 65 are used when an instruction is issued for contents reproduction.

Figure 11:
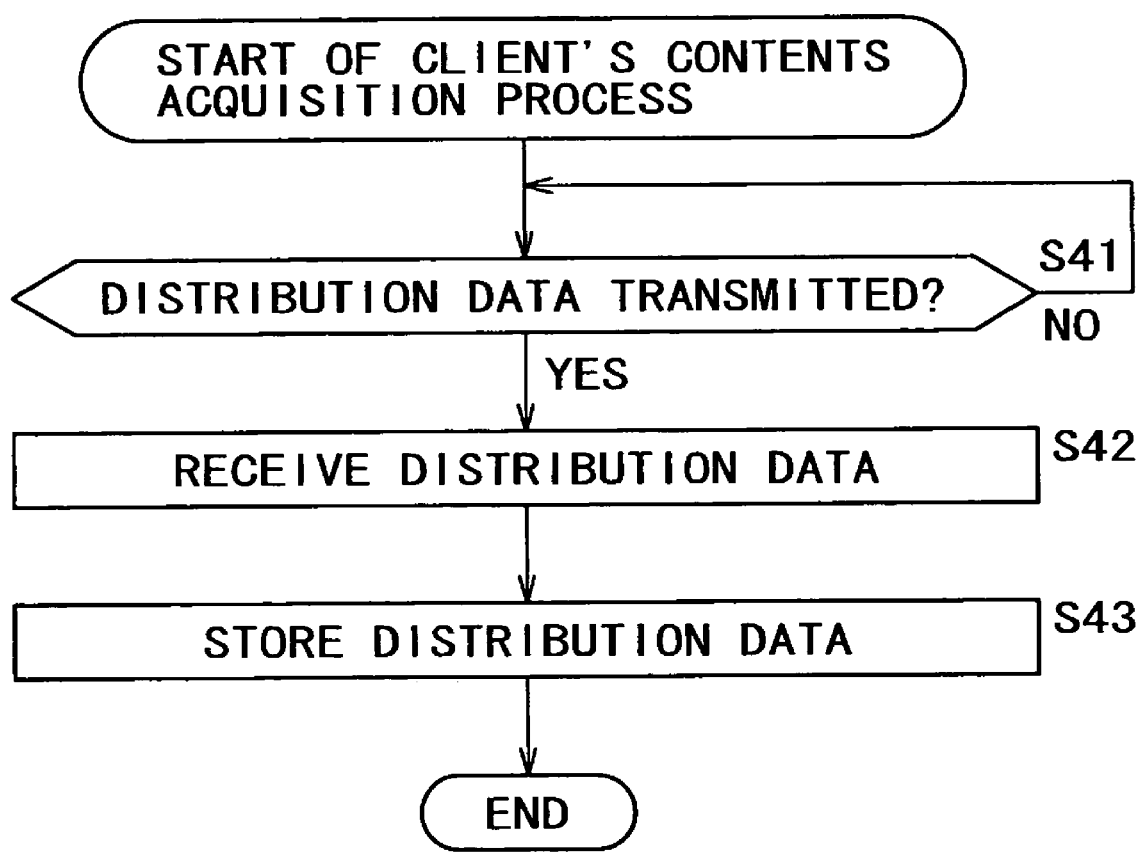
FIG. 11 is a flowchart illustrating a contents distribution process performed by a client shown in FIG. 1.

The process that a client performs to acquire distribution data transmitted from another client, which relates to the process indicated in FIG. 10, will now be described with reference to the flowchart in FIG. 11. The subsequent explanation mainly deals with a process that client 12-1 performs to acquire distribution data transmitted from client 11-1. In client 12-1, the CPU 21 executes a predetermined program so that the same elements are implemented as indicated in FIG. 5.

In step S41, the transmission/reception control section 61 of client 12-1 determines whether or not distribution data is transmitted from another client (client 11-1). The transmission/reception control section 61 stands by until it determines that distribution data is transmitted. If it is determined in step S41 that distribution data is transmitted from client 11-1, the transmission/reception control section 61 proceeds to step S42 and controls the communication section 29 to receive the transmitted distribution data. In step S43, the distribution data received by the transmission/reception control section 61 is stored in the contents storage section 66.

The process described above is repeatedly performed so that the contents storage section 66, which stores a plurality of contents as shown in FIG. 9, is also formulated in client 12-1. Further, client 12-1 performs the process shown in FIG. 10 with predetermined timing so that the contents stored in the contents storage section 66 of client 12-1 are transmitted to another client.

Figure 12:
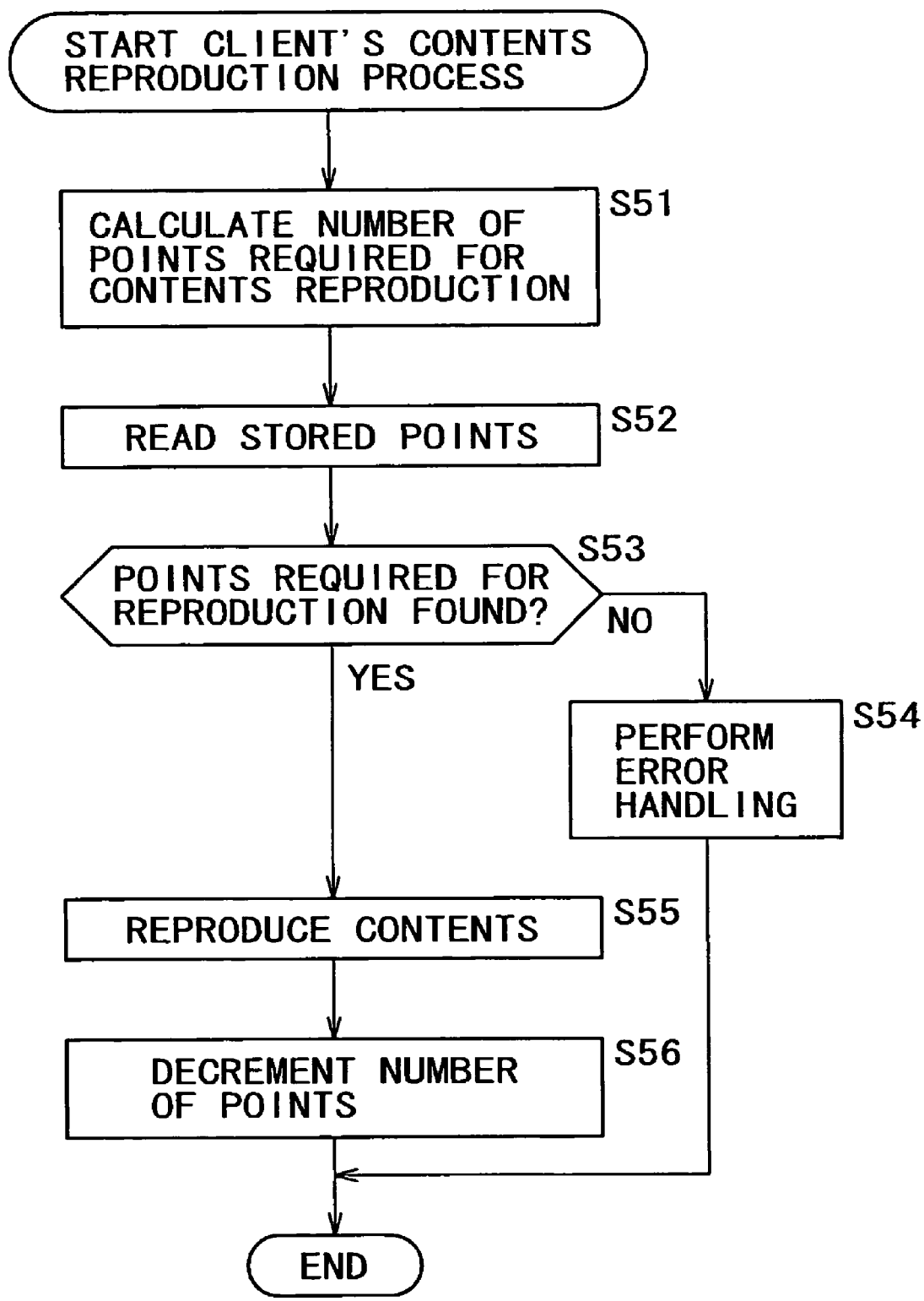
FIG. 12 is a flowchart illustrating a contents reproduction process performed by a client shown in FIG. 1.

The process for reproducing stored contents by a client will now be described with reference to the flowchart in FIG. 12. The subsequent explanation assumes that the process is performed by client 12-1.

When the user operates the input section 26 to issue an instruction for contents reproduction, the reproduction management section 64 performs step S51 to calculate the number of points required for reproducing user-designated contents and informs the point management section 63 of the calculation result.

The point management section 63 reads the points stored in the point storage section 65 in step S52, proceeds to step S53, and determines whether or not there are adequate points for contents reproduction. If, for example, 500 points are required for reproducing the user-designated contents and there are only 300 points in the point storage section 65, the point management section 63 proceeds to step S54, performs error handling and terminates the process. More specifically, error handling is performed so as to output a message to the output section 27 for the purpose of informing the user of the inability to reproduce the contents.

As described earlier, point accumulation occurs in accordance with a contents transmission to a remote client. Therefore, if, for example, 1000 points are stored in the point storage section 65 because relatively large amounts of contents were previously transmitted to remote clients, the point management section 63 determines in step S53 that it is possible to reproduce the contents, which require 500 points, and informs the reproduction management section 64 of such a determination.

In accordance with the determination conveyed from the point management section 63, the reproduction management section 64 reproduces the contents in step S55 and outputs the obtained video signal and audio signal to the output section 27. The image corresponding to the video signal reproduced by the reproduction management section 64 appears on the LCD, which is an element of the output section 27. The sound corresponding to the audio signal is output to the loudspeaker, which is an element of the output section 27.

In step S56, the point management section 63 subtracts the number of points used for contents reproduction from the number of points stored in the point storage section 65. If, for example, the contents requiring 500 points are reproduced in a situation where 1000 points are stored in the point storage section 65, the point management section 63 updates the number of points stored in the point storage section 65 to 500 points.

As described above, the user of each client can use contents in accordance with points, which are supplied according to the amount of contents transmitted to the other clients, that is, the points acquired by offering the client's communication function as the communication function of the contents distribution server 1.

Consequently, the clients can not only increase the number of stored points by transmitting contents to another client using a period of time during which the communication function is not used, but also use contents by making use of the stored points. Meanwhile, the contents distribution server 1 can not only reduce the process load required for contents supply, but also supply contents to many clients with ease.

It has been assumed that the destination designation information to be added to contents is arbitrarily selected by a destination designation information selection section 43. Alternatively, however, the information about contents reproduced by each client may be transmitted to the contents distribution server 1 so that an information selection is made according to the preferences of the user of each client.

When, for example, the contents distribution server 1 transmits contents concerning sports, the address information about only the clients used by sports-loving users is selected for such sports contents in accordance with the preference information transmitted from the clients. The selected address information is then added to the sports contents as destination designation information. This ensures that the sports contents are sequentially transmitted to clients used by sports-loving users. In this manner, contents can be distributed according to the preferences of individual users.

The points acquired upon contents transmission to a remote client may be supplied to a client in exchange of money amount information stored in an IC card or the amount of money in an account designated by a credit card. Further, the video signal and audio signal reproduced by a client may be supplied to a television receiver, which is wired or wirelessly connected to the client, and output from the television receiver.

It has been assumed that each client decides the distribution data (contents) destination in accordance with the information written in the distribution data header shown in FIG. 7. Alternatively, however, the contents destination may be determined from a destination list, which is updated with predetermined timing by the contents distribution server 1. This alternatively makes it possible to cope with dynamic changes in the network configuration.

For example, the destination list is set for a specific client and supplied. Upon receipt of the destination list, the client complies with the information written in the destination list and transmits contents to another client that is set as a destination. As described later, each client performs this process so that the same contents are distributed to all clients in a predetermined group.

Figure 13:
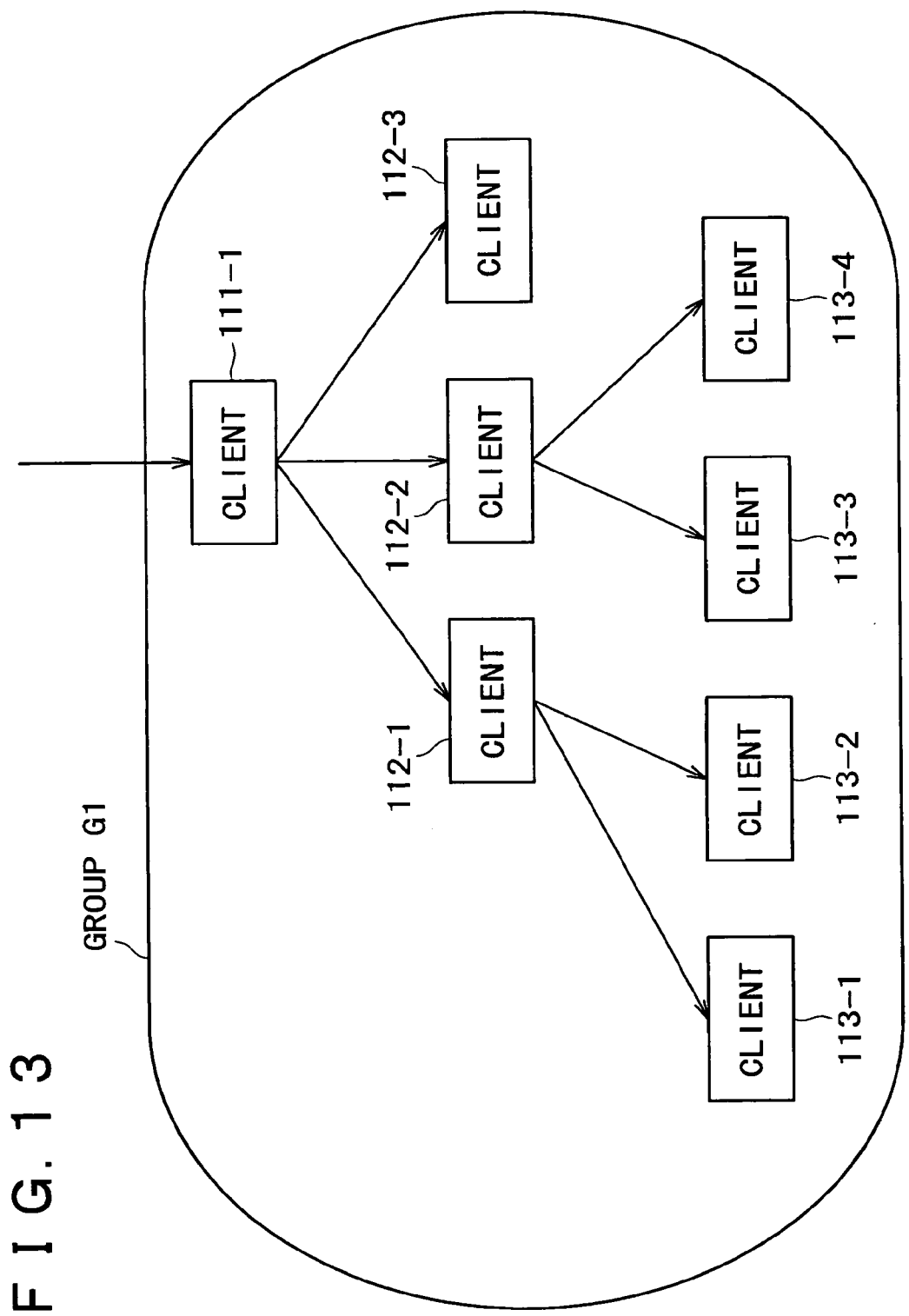
FIG. 13 is a schematic diagram illustrating an example of contents distribution.

FIG. 13 is a schematic diagram illustrating an operation that is performed to distribute contents in accordance with a destination list. For example, client 111-1 acquires a destination list and contents from the contents distribution server 1, selects clients 112-1 through 112-3 as contents destination clients in accordance with the information written in the destination list, and transmits the acquired contents to the destination clients.

The destination list is managed by the contents distribution server 1 as the information shown in FIG. 14.

In the leftmost column of a list shown in FIG. 14, client designation information is written. The information (destination addresses 1 through 3) written to the right of the leftmost column indicates contents destination clients to which the leftmost client transmits contents.

In the example shown in FIG. 14, the information written in the second line represents a destination list for client 111-1. The contents distribution server 1 supplies a destination list written in the second line to client 111-1 in accordance with the information ("111-1") written in the leftmost column. When the destination list is supplied from the contents distribution server 1, client 111-1 selects clients 112-1 through 112-3 as contents destination clients in accordance with destination addresses 1 through 3 (clients 112-1 through 112-3) that are written in the second line of FIG. 14.

As indicated in FIG. 13, client 111-1 then distributes contents to clients 112-1 through 112-3 in accordance with the destination list shown in FIG. 14.

Similarly, the contents distribution server 1 supplies the information written in the third line of FIG. 14 to client 112-1 as a destination list. Upon receipt of the destination list, client 112-1 transmits, for example, the contents supplied from client 111-1 to clients 113-1 and 113-2 in accordance with destination addresses 1 through 3. In the third line of the destination list shown in FIG. 14, "113-1" and "113-2" are written as destination address 1 and destination address 2, respectively. Client 112-1 transmits contents to clients 113-1 and 113-2 in accordance with such address information. It should also be noted that no client address is set in the destination address 3 column for client 112-1.

The information written in the lowest line of FIG. 14 is supplied to client 112-2 as a destination list, and contents are transmitted to clients 113-3 and 113-4 in accordance with the written information ("113-3" and "113-4").

In accordance with the destination list shown in FIG. 14, the contents supplied from the contents distribution server 1 are transmitted to all clients that belong to group G1, which is shown in FIG. 13. More specifically, client 111-1 transmits the contents to clients 112-1 through 112-3, and client 112-1 transmits the contents to clients 113-1 and 113-2. Further, client 112-2 transmits the contents to clients 113-3 and 113-4. Clients (not shown) also exist under clients 113-1 through 113-4. Clients 113-1 through 113-4 transmit the contents to such subordinate clients as well.

The destination list is updated by the contents distribution server 1 if any existing client cannot establish communication. For the destination list, identification information for identifying clients to which the list is supplied is set. Each client acquires its own destination list (updated destination list) in accordance with the identification information. The distribution system operation performed to distribute contents in accordance with an updated destination list will be described later with reference to a flowchart.

Group G1, which is shown in FIG. 13, is formed by means of collaborative filtering based on the user preference information about each client. Each user may be allowed to choose a group to belong to. Further, a group may be formed for each region in which clients are installed so that the same contents are distributed to the clients.

The processes performed by various devices composing the distribution system shown in FIG. 13 will now be described.

Figure 15:
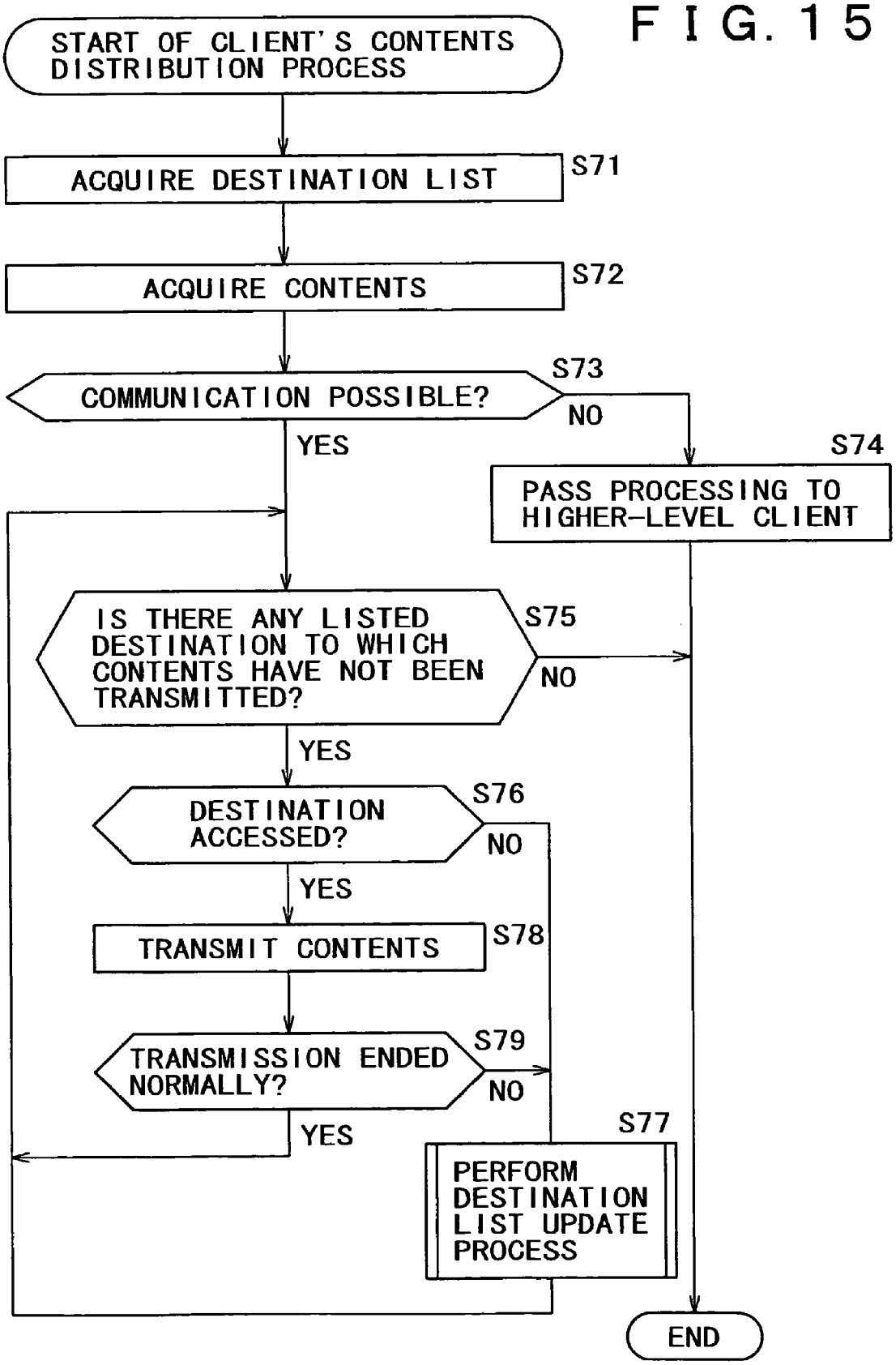
FIG. 15 is a flowchart illustrating a process performed by a client shown in FIG. 13.

First of all, the process that a client performs to distribute contents will now be described with reference to the flowchart in FIG. 15.

For example, in step S71, the CPU 21 of client 111-1 acquires a destination list from the contents distribution server 1, proceeds to step S72, and acquires contents. As described earlier, the storage section 28 stores the acquired contents.

In step S73, the CPU 21 determines whether or not communication can be established (whether or not the CPU 21 can establish communication). If it is determined that communication cannot be established, the CPU 21 proceeds to step S74 and passes processing to a higher-level client.

Therefore, if client 112-1 performs the process shown in FIG. 15 and it is determined in step S73 that communication cannot be established, client 111-1 instead of client 112-1 will subsequently perform the process. In other words, client 111-1 transmits the contents to clients that are designated by the destination list as the destinations to which client 112-1 transmits the contents.

If, on the other hand, it is determined in step S73 that communication can be established, the CPU 21 proceeds to step S75 and references the information written in the destination list to determine whether or not the contents have been transmitted to all the destinations (clients). If it is determined in step S75 that the contents have been transmitted to all the destination clients, the process terminates.

If it is determined in step S75 that the contents have not been transmitted to all clients in the destination list, the CPU 21 proceeds to step S76. If, for example, client 111-1 has not transmitted the contents to client 112-3, which is designated by destination address 3 as indicated in the destination list shown in FIG. 14, the CPU 21 of client 111-1 determines in step S75 that the contents have not been transmitted to all clients in the destination list.

The CPU 21 begins to access the clients designated by the destination list. In step S76, the CPU 21 determines whether or not access is gained (determines whether or not the access destination clients can establish communication). If it is determined in step S76 that access cannot be gained, the CPU 21 proceeds to step S77 and performs a process for updating the destination list.

In step S77, the information about inaccessed clients is conveyed to the contents distribution server 1 to update the destination list. The destination list update process to be performed in step S77 will be described later with reference to the flowchart in FIG. 16.

After completion of the destination list update process in step S77, processing returns to step S75 so as to repeatedly perform the subsequent processing steps.

If, on the other hand, it is determined in step S76 that the destination clients are accessed, the CPU 21 proceeds to step S78 and transmits the contents, which have been transmitted from the contents distribution server 1, to the accessed clients.

It means that client 111-1 transmits the contents, for example, to client 112-1, which is designated by destination address 1 as indicated in the destination list shown in FIG. 14.

In step S79, the CPU 21 determines whether or not the contents transmission is ended normally. If it is determined that the contents transmission is not ended normally, the CPU 21 proceeds to step S77 and performs a destination list update process. If, for example, communication is lost during contents transmission so that the contents transmission is not terminated normally, the destination list is updated in step S77.

If it is determined in step S79 that the contents transmission is terminated normally, the CPU 21 returns to step S75 and repeatedly performs the subsequent processing steps.

When the above process is repeatedly performed by each client, the same contents are distributed to all clients in a group.

Figure 16:
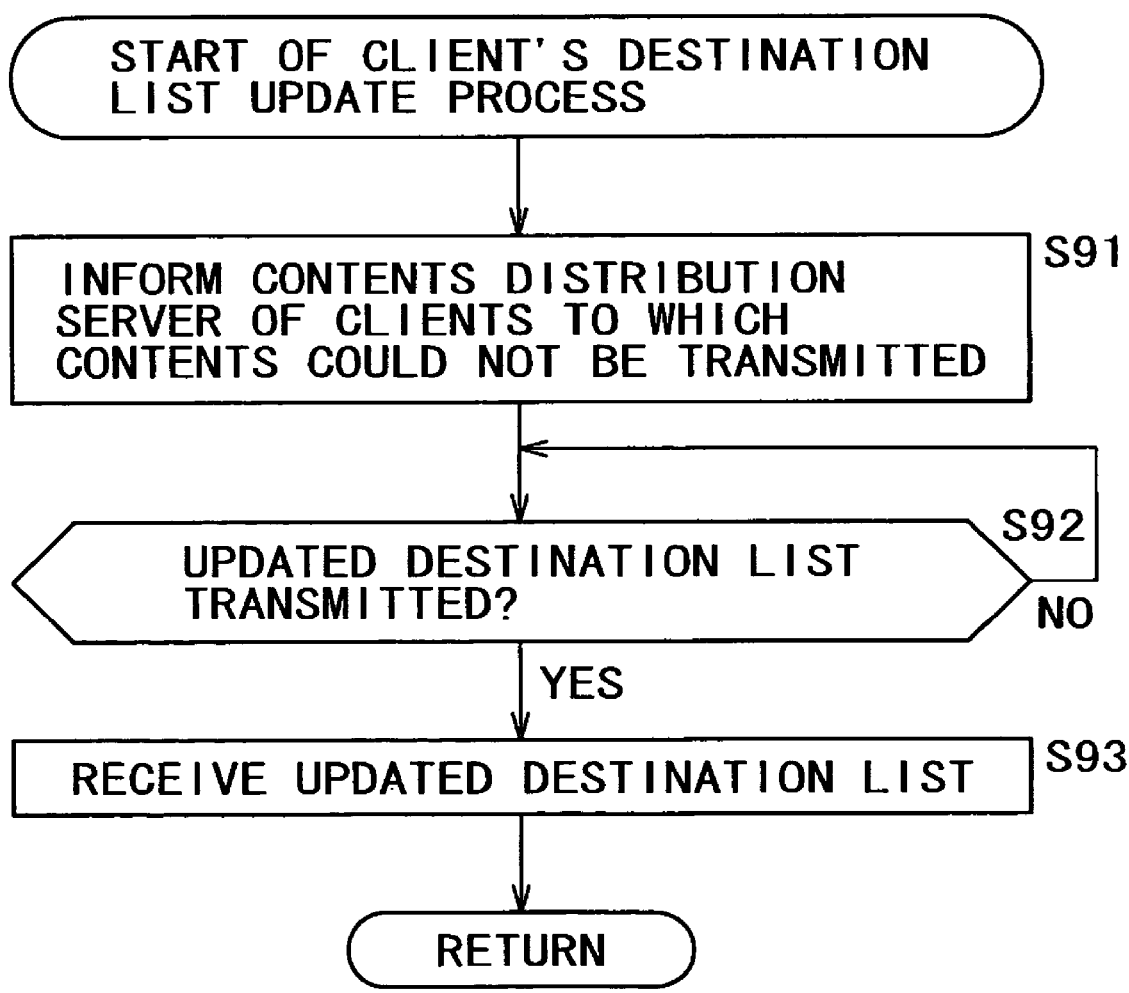
FIG. 16 is a flowchart illustrating in detail a destination list update process performed in step S77, which is shown in FIG. 15.

The process performed in step S77 in FIG. 15 to update the destination list of a client (e.g., client 111-1) will now be described with reference to the flowchart in FIG. 16.

In step S91, the CPU 21 conveys the information about clients to which contents have not been transmitted due to an address change to the contents distribution server 1, for example.

Upon receipt of the above information, the contents distribution server 1 generates a destination list in which are new addresses are written. The destination list updated in this manner is then conveyed to clients that need it (step S103 in FIG. 17).

In step S92, the CPU 21 determines whether or not the updated destination list is transmitted in accordance with the output from the communication section 29. The CPU 21 stands by until it is determined that the updated destination list is transmitted.

If it is determined in step S92 that the updated destination list is transmitted, the CPU 21 proceeds to step S93 and receives the updated destination list. Subsequently, processing steps S75 and beyond in FIG. 15 are performed to transmit the contents in accordance with the updated destination list.

The destination list update process that the contents distribution server 1 performs in response to the process shown in FIG. 16 will now be described with reference to the flowchart in FIG. 17.

In step S101, the CPU 21 of the contents distribution server 1 acquires the information about clients to which contents could not be transmitted. In other words, clients to which the contents could not be transmitted in accordance with the information written in the destination list conveys information including the identification information about their destination clients (step S91 in FIG. 16).

In step S102, the CPU 21 of the contents distribution server 1 updates the destination list by causing it to additionally list one of the destinations that are set as contents destination clients for clients to which the contents cannot be transmitted (clients that cannot establish communication). In this instance, the old information about the destinations is deleted.

In step S103, the CPU 21 transmits the destination list updated in step S102 to clients that need it.

When, for example, client 111-1 conveys the information about client 112-1 as the information about a client to which the contents cannot be transmitted as indicated in FIG. 13, the address of client 113-1 or 113-2, which is set as a destination of contents transmission by client 112-1 is added to the destination list for client 111-1 and supplied to client 111-1.

Subsequently, client 111-1 transmits the contents to client 113-1 in accordance with the updated destination list.

Further, the destination list for client 113-1 is also updated by the contents distribution server 1. The updated destination list is then supplied to client 113-1. In the foregoing example, the destination list for client 113-1 is such that the address of client 113-2, which is set as a destination of contents transmission by client 112-1 (client that cannot establish communication), is added to the addresses written in the destination list prevailing before the update. In other words, the destination list in which the addresses of clients (not shown) subordinate to client 113-1 and the address of client 113-2 are written is supplied to client 113-1.

Upon receipt of the updated destination list, client 113-1 transmits the contents supplied from client 111-1 to the subordinate clients and client 113-2 in accordance with the information written in the destination list.

As described above, one of the clients directly under a client that cannot establish communication (client 113-1, which is shown in the above example, directly under client 112-1, and cannot establish communication) functions as a substitute for a client that cannot establish communication, thereby distributing the contents.

When the above process is performed by all clients, contents can be distributed to a group in which the network configuration dynamically changes in accordance with the updated destination list while making effective use of hardware resources.

If a client that has been unable to establish communication reverts to normal (is now able to establish communication), the contents distribution server 1 is notified of the client's ability to establish communication so that the contents are supplied to the client that is now able to establish communication.

It has been assumed that each client waits until another client or the contents distribution server 1 distributes contents and then acquires the distributed contents. Alternatively, however, each client may be allowed to access the contents distribution server 1 and search, for example, for the address of a remote client that owns user-specified contents. Upon receipt of a notification of the address of a remote client possessing the contents from the contents distribution serve 1, each client accesses a client designated by the address and then makes a request for contents transmission. As described earlier, the contents transmitted in compliance with the request can be reproduced depending on the calculated number of points.

The above contents distribution may be performed in compliance with the IGMP (Internet Group Management Protocol), DVMRP (Distance Vector Multicast Routing Protocol), or other multicast protocol. An alternative is to accomplish contents distribution by means of P2P (peer-to-peer) communication, which is established without the use of a server.

It has been assumed that a group to which the same contents are distributed is formed in accordance with the preference information about the user or a user selection. Alternatively, however, infrequently busy clients in the group may be set as higher-level clients (clients near the root) to form a network on a tree-structure shown in FIG. 13 so that the lower the frequency of a client's communication line use, the higher the client level. Another alternative is to let the contents distribution server 1 manage networked clients whose address infrequently changes as high-level clients. This ensures that a large amount of contents can be distributed with increased certainty.

It has been assumed that the contents distribution server 1 exercises management over contents distribution and destination list supply. Alternatively, however, different servers may be used to exercise management over contents distribution and destination list supply, respectively.

A series of processes described above may be performed by either hardware or software.

When a series of processes is to be performed by software, the programs constituting the software are installed from a network or a recording medium onto a computer built in dedicated hardware or a general-purpose personal computer, which can exercise various functions when various programs are installed.

The recording medium may not only be a package medium such as a magnetic disk 31 (flexible disk included), an optical disk 32 (CD-ROM (Compact Disk-Read Only Memory)), a DVD (Digital Versatile Disk), a magneto-optical disk 33 (MD (registered trademark) (Mini-Disk)), a semiconductor memory 34, or the like, which records a program and is distributed separately from the apparatus main body to supply the program to the user, but also be a ROM 22 for recording a program, a hard disk contained in the storage section 28, or the like, which is built in the main body of the apparatus before being supplied to the user.

In the present description, the steps for writing the program to be recorded on a recording medium not only include processes that are performed in a described time-series order but also include processes that are performed parallelly or individually and not necessarily in time-series order.

Further, the term "system", which is used in the present description, represents an aggregate of a plurality of apparatuses.

INDUSTRIAL APPLICABILITY

The present invention is capable of distributing contents to a plurality of clients. Further, the present invention permits efficient use of hardware resources. Furthermore, the present invention ensures that contents can be used in accordance with information that is supplied when the contents are transmitted to remote clients.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information processing apparatus for a central server type distribution service, the information processing apparatus comprising:
   a transmitter;
   a hardware processor; and
   a memory device storing:
   (a) contents and designation information, wherein the designation information includes: (i) a first destination designation information set; (ii) a second destination designation information set; and (iii) a third destination designation information set, wherein the contents and designation information are supplied from an information management apparatus that manages a supply of the contents and the designation information, wherein said first destination designation information set is referenced to acquire said contents from said information management apparatus; and
   (b) instructions which when executed by the processor, cause the processor to operate with the transmitter to:
      (i) transmit to a second information processing apparatus:
         (A) the acquired contents supplied from said information management apparatus;
         (B) said second destination designation information set supplied from said information management apparatus, wherein said second information processing apparatus references said second destination designation information set to acquire said contents; and
         (C) said third destination designation information set supplied from said information management apparatus, wherein a third information processing apparatus references said third destination designation information set to acquire said contents from the second information processing apparatus, wherein the third information processing apparatus is subordinate to the second information processing apparatus;
      (ii) calculate a distribution cost of said transmitted contents;
      (iii) manage price information indicating a price for use of said contents that corresponds to said calculated distribution cost; and
      (iv) determine points based on an amount of said transmitted contents.

2. The information processing apparatus of claim 1, wherein when executed by the hardware processor, the instructions cause the processor to acquire contents from at least one of the information management apparatus, the second information processing apparatus and the third information processing apparatus that receives the supply of said contents from said information management apparatus, said memory device storing said acquired contents.

3. The information processing apparatus of claim 1, wherein when executed by the hardware processor, the instructions cause the processor to reproduce said contents in accordance with said managed price information.

4. The information processing apparatus of claim 1, wherein when executed by hardware processor, the instructions cause the processor to:

(a) calculate the time during which said contents are transmitted; and
(b) regard the calculated time as said distribution cost.

5. The information processing apparatus of claim 1, wherein when executed by the hardware processor, the instructions cause the processor to:

(a) calculate the data amount of said transmitted contents; and
(b) regard the calculated data amount as said distribution cost.

* * * * *